United States Patent
Boivie et al.

(10) Patent No.: US 9,223,965 B2
(45) Date of Patent: Dec. 29, 2015

(54) SECURE GENERATION AND MANAGEMENT OF A VIRTUAL CARD ON A MOBILE DEVICE

(71) Applicant: INTERNATIONAL BUSINESS MACHINES CORPORATION, Armonk, NY (US)

(72) Inventors: Richard H. Boivie, Monroe, CT (US); Robert R. Friedlander, Southbury, CT (US); James R. Kraemer, Santa Fe, NM (US); Jeb R. Linton, Manassas, VA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/101,916

(22) Filed: Dec. 10, 2013

(65) Prior Publication Data

US 2015/0161382 A1    Jun. 11, 2015

(51) Int. Cl.
| | |
|---|---|
| G06F 21/53 | (2013.01) |
| G06K 19/06 | (2006.01) |
| H04L 29/08 | (2006.01) |
| G06F 17/30 | (2006.01) |

(52) U.S. Cl.
CPC .......... *G06F 21/53* (2013.01); *G06K 19/06037* (2013.01); *G06K 19/06112* (2013.01); *H04L 67/02* (2013.01); *G06F 17/30598* (2013.01)

(58) Field of Classification Search
CPC .......................... G06F 17/30598; H04L 67/02
USPC .................................................. 713/165, 193
See application file for complete search history.

(56) References Cited

U.S. PATENT DOCUMENTS

| | | | |
|---|---|---|---|
| 5,222,139 | A | 6/1993 | Takaragi et al. |
| 5,481,613 | A | 1/1996 | Ford et al. |
| 5,615,263 | A | 3/1997 | Takahashi |
| 5,845,281 | A | 12/1998 | Benson et al. |
| 6,000,016 | A | 12/1999 | Curtis et al. |
| 6,185,685 | B1 | 2/2001 | Morgan et al. |

(Continued)

FOREIGN PATENT DOCUMENTS

| | | |
|---|---|---|
| CN | 102413022 A | 4/2012 |
| JP | 2006-209703 A | 8/2006 |

(Continued)

OTHER PUBLICATIONS

International Searching Authority, Written Opinion for PCT/CA2014/050685, mailed Oct. 23, 2014.

(Continued)

*Primary Examiner* — Dao Ho
(74) *Attorney, Agent, or Firm* — Law Office of Jim Boice (57) ABSTRACT

A method, system, and/or computer program product securely generates and/or manages a virtual card on a mobile device. The mobile device receives a protected application, which initially cannot be accessed by an operating system for execution by a processor. The mobile device also receives a security object, which is used to convert the received protected application into an executable application that can be utilized by the operating system for execution by the processor. The executable application is then executed by the processor to act as a virtual card, which provides a functionality of a predefined physical electronic or magnetic-stripe card.

16 Claims, 6 Drawing Sheets

(56) References Cited

U.S. PATENT DOCUMENTS

| | | | |
|---|---|---|---|
| 6,397,331 B1 | 5/2002 | Ober et al. | |
| 6,523,118 B1 | 2/2003 | Buer | |
| 6,704,871 B1 | 3/2004 | Kaplan et al. | |
| 6,708,273 B1 | 3/2004 | Ober et al. | |
| 6,751,709 B2 | 6/2004 | Seidl et al. | |
| 6,968,420 B1 | 11/2005 | Giles et al. | |
| 7,043,616 B1 | 5/2006 | McGrath | |
| 7,055,040 B2 | 5/2006 | Klemba et al. | |
| 7,167,956 B1 | 1/2007 | Wright et al. | |
| 7,249,225 B1 | 7/2007 | Seidl et al. | |
| 7,260,726 B1 | 8/2007 | Doe et al. | |
| 7,281,138 B1 | 10/2007 | Di Benedetto | |
| 7,290,288 B2 | 10/2007 | Gregg et al. | |
| 7,413,113 B1 | 8/2008 | Zhu | |
| 7,483,930 B1 | 1/2009 | Wright et al. | |
| 7,673,180 B1 | 3/2010 | Chen et al. | |
| 7,920,851 B2 | 4/2011 | Moshir et al. | |
| 7,933,413 B2 | 4/2011 | Steeves et al. | |
| 8,002,175 B2 | 8/2011 | Kuriyama et al. | |
| 8,041,947 B2 | 10/2011 | O'Brien et al. | |
| 8,055,910 B2 | 11/2011 | Kocher et al. | |
| 8,108,641 B2 | 1/2012 | Goss et al. | |
| 8,485,440 B1 | 7/2013 | Arora et al. | |
| 8,572,400 B2 | 10/2013 | Lin et al. | |
| 8,578,175 B2 | 11/2013 | Boivie et al. | |
| 8,600,883 B2 | 12/2013 | Wong | |
| 2001/0010722 A1 | 8/2001 | Enari | |
| 2001/0014157 A1 | 8/2001 | Hashimoto et al. | |
| 2001/0050990 A1 | 12/2001 | Sudia | |
| 2002/0064283 A1 | 5/2002 | Parenty | |
| 2002/0172368 A1 | 11/2002 | Peterka | |
| 2003/0084346 A1* | 5/2003 | Kozuch et al. | 713/201 |
| 2004/0039926 A1* | 2/2004 | Lambert | 713/189 |
| 2004/0123127 A1 | 6/2004 | Teicher et al. | |
| 2004/0139346 A1 | 7/2004 | Watt et al. | |
| 2004/0181303 A1 | 9/2004 | Walmsley | |
| 2004/0215876 A1* | 10/2004 | Roberti | 711/113 |
| 2005/0038998 A1 | 2/2005 | Ueno et al. | |
| 2005/0044390 A1 | 2/2005 | Trostle | |
| 2005/0044534 A1 | 2/2005 | Darweesh et al. | |
| 2005/0076226 A1 | 4/2005 | Boivie et al. | |
| 2005/0105738 A1 | 5/2005 | Hashimoto | |
| 2005/0166069 A1 | 7/2005 | Hashimoto et al. | |
| 2005/0177742 A1 | 8/2005 | Benson et al. | |
| 2006/0106801 A1 | 5/2006 | Cox et al. | |
| 2006/0156418 A1 | 7/2006 | Polozoff | |
| 2006/0242611 A1 | 10/2006 | Drake | |
| 2007/0033281 A1 | 2/2007 | Hwang et al. | |
| 2007/0047735 A1* | 3/2007 | Celli et al. | 380/30 |
| 2007/0101124 A1 | 5/2007 | Pitts | |
| 2007/0133795 A1 | 6/2007 | Kahn et al. | |
| 2007/0168997 A1 | 7/2007 | Tran | |
| 2007/0294671 A1 | 12/2007 | Demetriou et al. | |
| 2008/0072068 A1 | 3/2008 | Wang et al. | |
| 2008/0109903 A1 | 5/2008 | Werner et al. | |
| 2008/0155273 A1 | 6/2008 | Conti | |
| 2008/0222420 A1 | 9/2008 | Serret-Avila | |
| 2008/0282093 A1 | 11/2008 | Hatakeyama | |
| 2008/0288786 A1 | 11/2008 | Fiske | |
| 2008/0301441 A1 | 12/2008 | Calman et al. | |
| 2009/0006796 A1 | 1/2009 | Chang et al. | |
| 2009/0006864 A1 | 1/2009 | Hashimoto et al. | |
| 2009/0063651 A1 | 3/2009 | Brahmavar | |
| 2009/0217385 A1 | 8/2009 | Teow et al. | |
| 2009/0259857 A1 | 10/2009 | Gehrmann | |
| 2009/0300366 A1 | 12/2009 | Gueller et al. | |
| 2009/0319782 A1 | 12/2009 | Lee | |
| 2010/0031061 A1 | 2/2010 | Watanabe et al. | |
| 2010/0119068 A1 | 5/2010 | Harris | |
| 2010/0125509 A1 | 5/2010 | Kranzley et al. | |
| 2010/0153746 A1 | 6/2010 | Takeuchi et al. | |
| 2010/0161904 A1 | 6/2010 | Cypher et al. | |
| 2010/0162049 A1 | 6/2010 | Stall et al. | |
| 2010/0262824 A1 | 10/2010 | Keshavachar et al. | |
| 2010/0279610 A1 | 11/2010 | Bjorhn et al. | |
| 2010/0281273 A1 | 11/2010 | Lee et al. | |
| 2010/0332843 A1 | 12/2010 | Boivie et al. | |
| 2010/0332850 A1 | 12/2010 | Boivie et al. | |
| 2011/0064217 A1 | 3/2011 | Fry et al. | |
| 2011/0191244 A1 | 8/2011 | Dai | |
| 2012/0006891 A1 | 1/2012 | Zhou et al. | |
| 2012/0151265 A1 | 6/2012 | Bender et al. | |
| 2012/0158581 A1 | 6/2012 | Cooley et al. | |
| 2012/0216051 A1 | 8/2012 | Boivie et al. | |
| 2013/0061058 A1 | 3/2013 | Boivie et al. | |
| 2013/0097034 A1 | 4/2013 | Royyuru et al. | |
| 2014/0181533 A1 | 6/2014 | Boivie et al. | |
| 2014/0245266 A1 | 8/2014 | Sun | |
| 2015/0033078 A1 | 1/2015 | Wintergerst et al. | |
| 2015/0033205 A1 | 1/2015 | Wintergerst et al. | |

FOREIGN PATENT DOCUMENTS

| | | | |
|---|---|---|---|
| JP | 2006-227777 | | 8/2006 |
| WO | 9854633 | | 12/1998 |
| WO | 2008003833 | A1 | 1/2008 |
| WO | 2012111019 | A1 | 8/2012 |
| WO | 2013177500 | A1 | 11/2013 |
| WO | WO2013177500 | A1 * | 11/2013 |

OTHER PUBLICATIONS

Pirker, M. et al., "A Framework for Privacy-Preserving Mobile Payment on Security Enhanced ARM TrustZone Platforms", Proceedings of 2012 IEEE 11th International Conference on Trust, Security and Privacy in Computing and Communications, Jun. 2012, pp. 1155-1160.

Gao, J. et al., "A 2D Barcode-Based Mobile Payment System", Proceedings of the Third International Conference on Multimedia and Ubiquitous Engineering, Jun. 2009, pp. 320-329.

U.S. Appl. No. 13/226,079—Non-Final Office Action Mailed Aug. 14, 2013.

U.S. Appl. No. 13/033,367—Notice of Allowance Mailed Jul. 23, 2013.

U.S. Appl. No. 13/033,367—Final Office Action Mailed Mar. 25, 2013.

U.S. Appl. No. 13/033,367—Non-Final Office Action Mailed Nov. 9, 2012.

U.S. Appl. No. 12/878,696—Final Office Action Mailed Oct. 4, 2013.

U.S. Appl. No. 12/878,696—Non-Final Office Action Mailed Mar. 18, 2013.

U.S. Appl. No. 13/033,455—Final Office Action Mailed Jul. 16, 2013.

U.S. Appl. No. 13/033,455—Non-Final Office Action Mailed Nov. 20, 2012.

International Bureau, International Application No. PCT/US2010/001811—Preliminary Report on Patentability Mailed Jan. 12, 2012.

U.S. Appl. No. 12/492,738—Non-Final Office Action Mailed Aug. 14, 2013.

U.S. Appl. No. 12/492,738—Final Office Action Mailed Jun. 5, 2013.

U.S. Appl. No. 12/492,738—Non-Final Office Action Mailed Mar. 26, 2013.

J. Markoff, "Killing the Computer to Save It", The New York Times, www.nytimes.com, Oct. 29, 2012, pp. 1-6.

ARM Limited, "ARM Security Technology: Building a Secure System Using Trustzone Technology", ARM Limited, Apr. 2009, pp. 1-108.

U.S. Appl. No. 14/105,635—Non-Final Office Action mailed Apr. 9, 2015.

P. Williams et al., "CPU Support for Secure Executables", the 4th International Conference on Trust and Trustworthy Computing, 2011, Pittsburgh, PA, pp. 1-15.

P. Williams et al., "CPU Support for Secure Executables", Stony Brook University Power Point Presentation at the 4th International Conference on Trust and Trustworthy Computing, 2011, Pittsburgh, PA, pp. 1-23.

H. Levy, "Capability-Based Computer Systems", Digital Press, 1984, pp. 1-229.

(56) References Cited

OTHER PUBLICATIONS

T. Linden, "Operating System Structure to Support Security and Reliable Software", Institute for Computer Sciences and Technology, National Bureau of Standards, Washington, DC, ACM Computing Survey, vol. 8, No. 4, Dec. 1976, pp. 1-56.

Canetti et al., "A Two Layers Approach for Securing an Object Store Network", Proceedings of the First International IEEE Security in Storage Work-Shop, 2002, pp. 1-14.

Wang et al., "Keep Passwords Away from Memory: Password Caching and Verification Using TPM", 22nd International Conference on Advanced Information Networking and Applications, IEEE, pp. 755-762.

Catrein et al., "Private Domains in Networks of Information", IEEE International conference Communications Work-Shops, 2009, pp. 1-5.

D. Frincke, "Developing Secure Objects", Proceedings of the 19th National Information Systems Security Conference, 1996, pp. 410-419.

Somogyi et al., "Secure, Object-Oriented, Client-Server Middleware", Information Networking Institute, Carnegie Mellon University, 1998, pp. 1-21.

SAP AG, "Crystal Reports Server—A Functional Overview", SAP AG, Sap Functions in Detail, 2009, pp. 1-15.

Haifeng et al., "Memory Confidentiality and Integrity Protection Method Based on Variable Length Counter", IEEE, 2012, pp. 290-294.

U.S. Appl. No. 12/492,738—Final Office Action mailed Feb. 12, 2014.

U.S. Appl. No. 12/492,738—Notice of Allowance mailed May 5, 2014.

Suh et al., "Efficient Memory Integrity Verification and Encryption for Secure Processors", IEEE, 36th International Symposium on Microarchitecture, 2003, pp. 1-12.

Yang et al., "Fast Secure Processor for Inhibiting Software Piracy and Tampering", IEEE, 36th International Symposium on Microarchitecture, 2003, pp. 1-10.

U.S. Appl. No. 14/017,555—Non-Final Office Action mailed May 30, 2014.

U.S. Appl. No. 13/033,455—Notice of Allowance mailed Jul. 7, 2014.

U.S. Appl. No. 14/017,555—Final Office Action mailed Dec. 3, 2014.

International Searching Authority, Written Opinion for PCT/CN2014/089005 mailed Jan. 21, 2015.

* cited by examiner

SECURE GENERATION AND MANAGEMENT OF A VIRTUAL CARD ON A MOBILE DEVICE

BACKGROUND

The present disclosure relates to the field of computers, and specifically to computers that are within mobile devices. Still more particularly, the present disclosure relates to generating and/or managing a virtual card on a mobile device.

Most mobile devices, such as smart phones, personal digital assistants, etc., contain enough processing power to run applications. As such, however, these mobile devices are subject to malicious attacks via a network (e.g., a cell phone network, the Internet, etc.) to which they are communicatively coupled, particularly when the mobile devices are attempting to run such applications.

SUMMARY

A method, system, and/or computer program product securely generates and/or manages a virtual card to be issued to and executed on a mobile device. The mobile device receives a protected application, which initially cannot be accessed by an operating system for execution by a processor. The mobile device also receives a security object, which enables conversion of the received protected application into an executable application that can be utilized by the operating system for execution by the processor. The executable application is then executed by the processor to act as a virtual card, which provides a functionality of a predefined physical electronic card.

BRIEF DESCRIPTION OF THE SEVERAL VIEWS OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION

Figure 1:
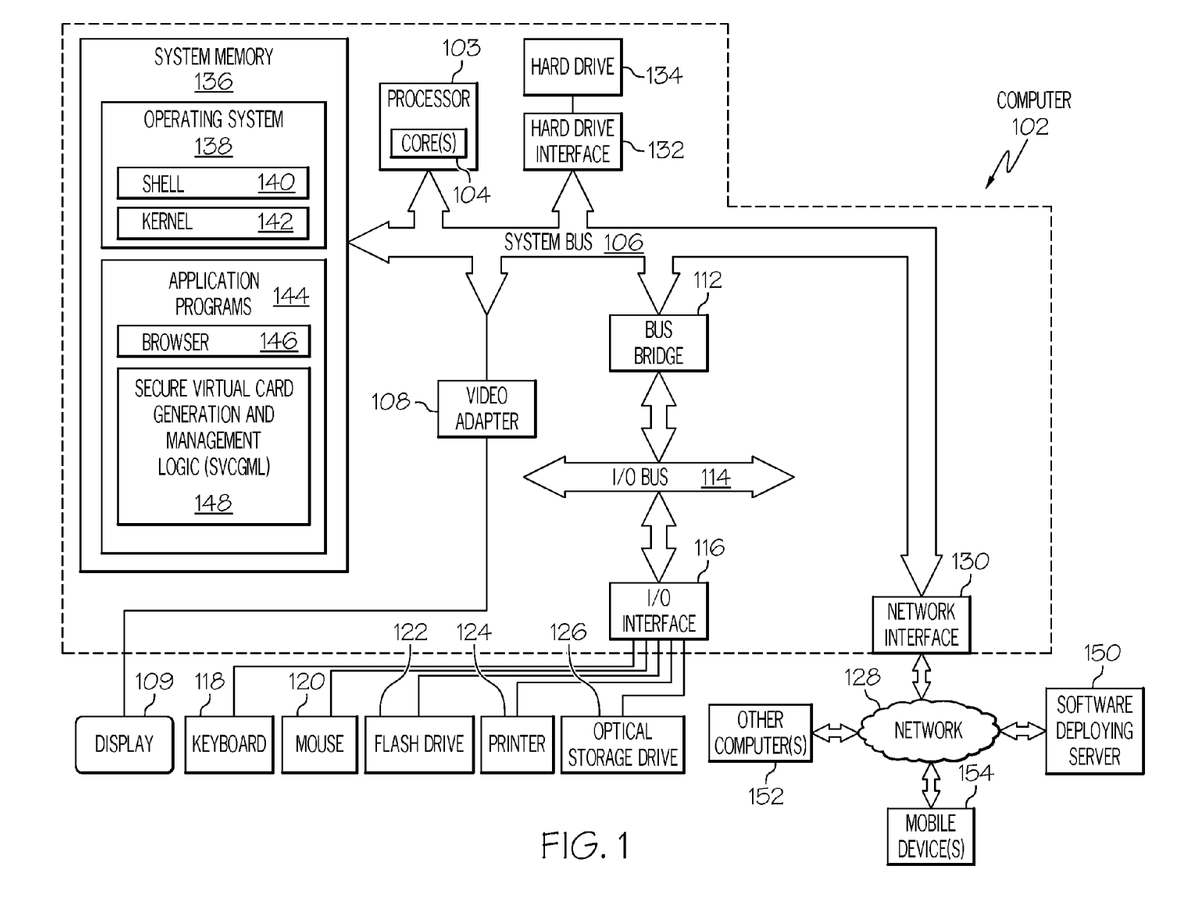
FIG. 1 depicts an exemplary computer which may be utilized by the present invention.

With reference now to the figures, and particularly to FIG. 1, there is depicted a block diagram of an exemplary computer 102, which the present invention may utilize. Note that some or all of the exemplary architecture shown for computer 102 may be utilized by software deploying server 150, other computer(s) 152, and/or mobile device(s) 154.

Computer 102 includes a processor 103, which may utilize one or more processors each having one or more processor cores 104. Processor 103 is coupled to a system bus 106. A video adapter 108, which drives/supports a display 109, is also coupled to system bus 106. System bus 106 is coupled via a bus bridge 112 to an Input/Output (I/O) bus 114. An I/O interface 116 is coupled to I/O bus 114. I/O interface 116 affords communication with various I/O devices, including a keyboard 118, a mouse 120, a Flash Drive 122, a printer 124, and an optical storage device 126 (e.g., a CD or DVD drive). The format of the ports connected to I/O interface 116 may be any known to those skilled in the art of computer architecture, including but not limited to Universal Serial Bus (USB) ports.

Computer 102 is able to communicate with a software deploying server 150 via network 128 using a network interface 130, which is coupled to system bus 106. Network 128 may be an external network such as the Internet, or an internal network such as an Ethernet or a Virtual Private Network (VPN).

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a World Wide Web (WWW) client (i.e., computer 102) to send and receive network messages to the Internet using HyperText Transfer Protocol (HTTP) messaging, thus enabling communication with software deploying server 150 and other described computer systems.

Application programs 144 in computer 102's system memory (as well as software deploying server 150's system memory) also include a Secure Virtual Card Generation and Management Logic (SVCGML) 148. SVCGML 148 includes code for implementing the processes described below in FIGS. 2-6. In one embodiment, computer 102 is able to download SVCGML 148 from software deploying server 150, including in an on-demand basis. Note further that, in one embodiment of the present invention, software deploying server 150 performs all of the functions associated with the present invention (including execution of SVCGML 148), thus freeing computer 102 from having to use its own internal computing resources to execute SVCGML 148.

The hardware elements depicted in computer 102 are not intended to be exhaustive, but rather are representative to highlight essential components required by the present invention. For instance, computer 102 may include alternate memory storage devices such as magnetic cassettes, Digital Versatile Disks (DVDs), Bernoulli cartridges, and the like. These and other variations are intended to be within the spirit and scope of the present invention.

Figure 2:
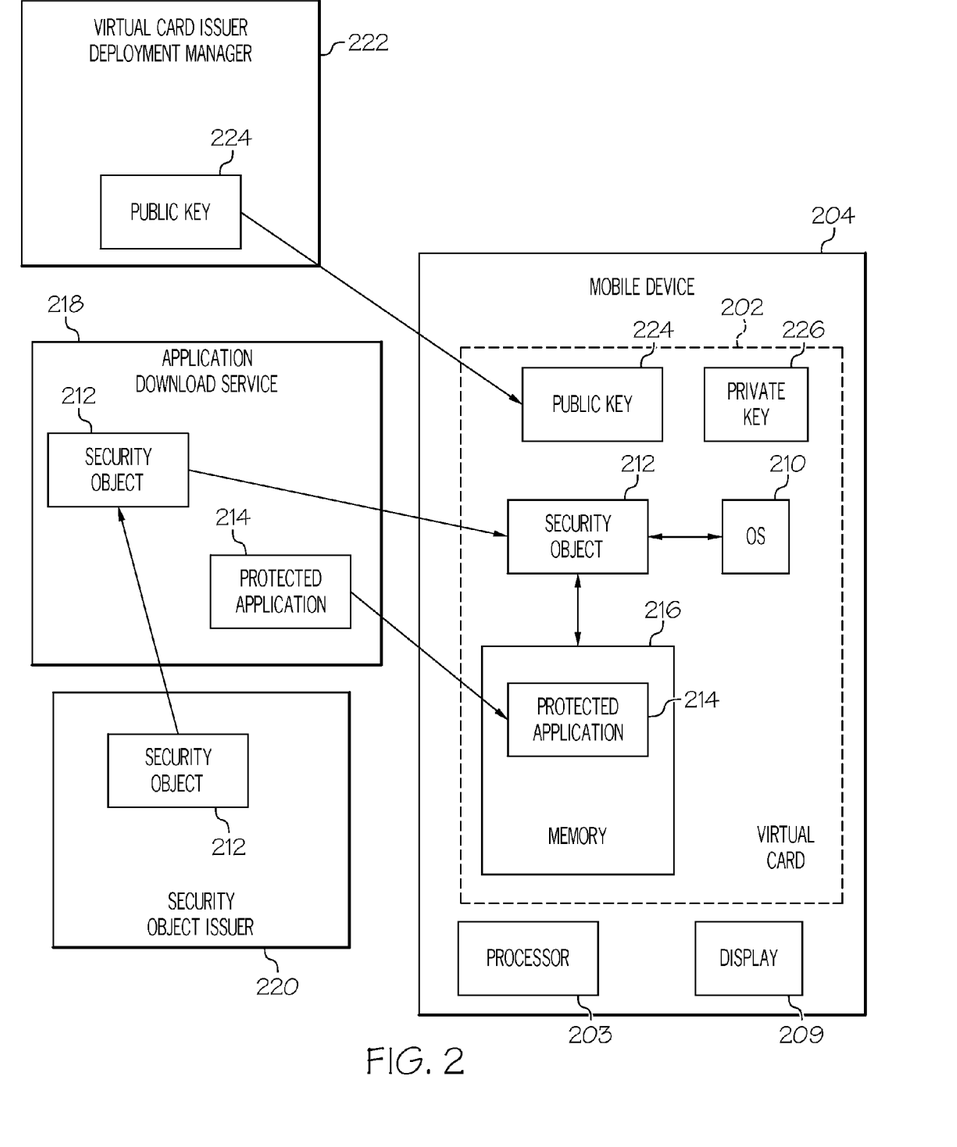
FIG. 2 illustrates a virtual card being implemented within a mobile device in accordance with one embodiment of the present invention.

With reference now to FIG. 2, an exemplary virtual card 202 as implemented within a mobile device 204 (e.g., one of the mobile device(s) 154 depicted in FIG. 1) is illustrated in accordance with one embodiment of the present invention. Mobile device 204 may be any mobile device containing a processor 203 (e.g., processor 103 depicted in FIG. 1) and a display 209 (e.g., display 109 shown in FIG. 1), such as a smart phone, a personal digital assistant, a tablet computer, etc. The virtual card 202 is defined as a software-based entity that has the functional equivalent of a physical card, such as a credit/debit card, personal identification card, building access card, a gift card, etc. Such physical cards typically have information related to the card and/or a holder of the card, such as account numbers associated with the card, a monetary value of the card, identity information about the holder of the card, etc., encoded on a magnetic strip or within a non-volatile electronic memory. When swiped across a reader, the card provides sufficient information to 1) access a server that contains account/identification/authorization information about the card and/or its user, and/or 2) directly provide such account/identification/authorization information about/for the card/user to the reader.

In one embodiment of the present invention, the virtual card 202 is implemented by an operating system 210 (within the mobile device 204) accessing and executing a requisite application that is part of the virtual card 202. However, without the present invention, this leaves this requisite application vulnerable to attack, since in the prior art the operating system and requisite application were both unprotected. That is, the requisite application (which is part of the virtual card) "trusted" the operating system 210, such that a hack into the operating system 210 would allow the hacked operating system 210 to access and maliciously abuse any applications under the control of the operating system 210. In order to reduce and/or eliminate this exposure, a security object 212 is utilized by the present invention. In one embodiment, security object 212 is compilable and/or executable software code that performs the processes described herein to access a protected application 214. In another embodiment, security object 212 is a credential, token, key, or other object that is used by an executable program to afford access to the protected application 214 described herein.

In one embodiment, security object 212 is used to decrypt a protected application 214. For example, consider protected application 214 within memory 216. Memory 216 may be system memory, L2/L3 cache memory, or even persistent memory (e.g., a flash drive, a hard drive, etc.) within the mobile device 204. While in its encrypted form (as originally received from an application download service 218), protected application 214 is unable to be implemented for execution via OS 210 by processor 203 in mobile device 204. That is, OS 210 is unable to address/call various operands from the protected application 214, and then send them to the processor 203 for execution.

Figure 3:
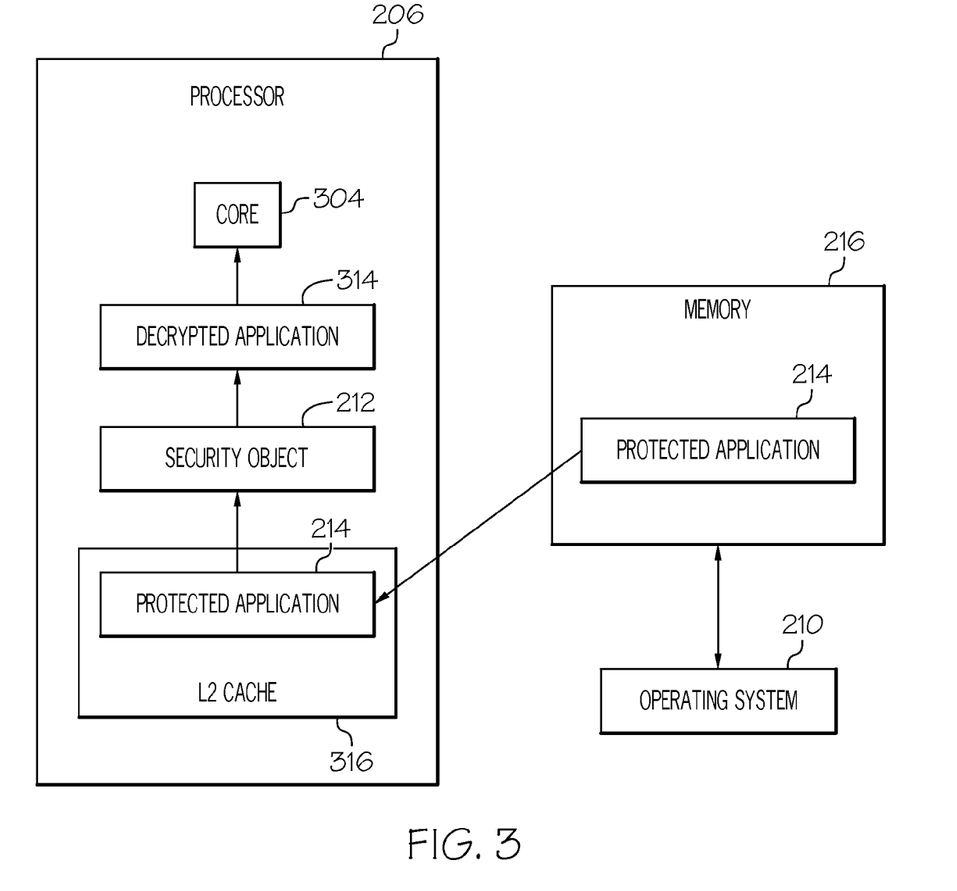
FIG. 3 depicts additional detail of a protected application within a virtual card being decrypted inside a processor in the mobile device.

However, FIG. 3 depicts additional detail of one embodiment in which the security object 212 is able to make the protected application 214 executable. More specifically, in one embodiment the security object 212 enables the processor to decrypt the protected application 214 inside a processor 203 in the mobile device, which creates and enables management of the virtual card 202 within the mobile device 204. For example, assume that protected (e.g., "encrypted") application 214 is moved in its encrypted form from memory 216 within the mobile device to an operational memory within the processor 203, such as an L2 cache 316 (e.g., L2 cache 416 shown in FIG. 4 below). When read into the L2 cache 316, the protected application 214 is decrypted, and thus rendered executable within the core 304 of the processor 203. Details of an exemplary core 304 are presented in FIG. 4.

Figure 4:
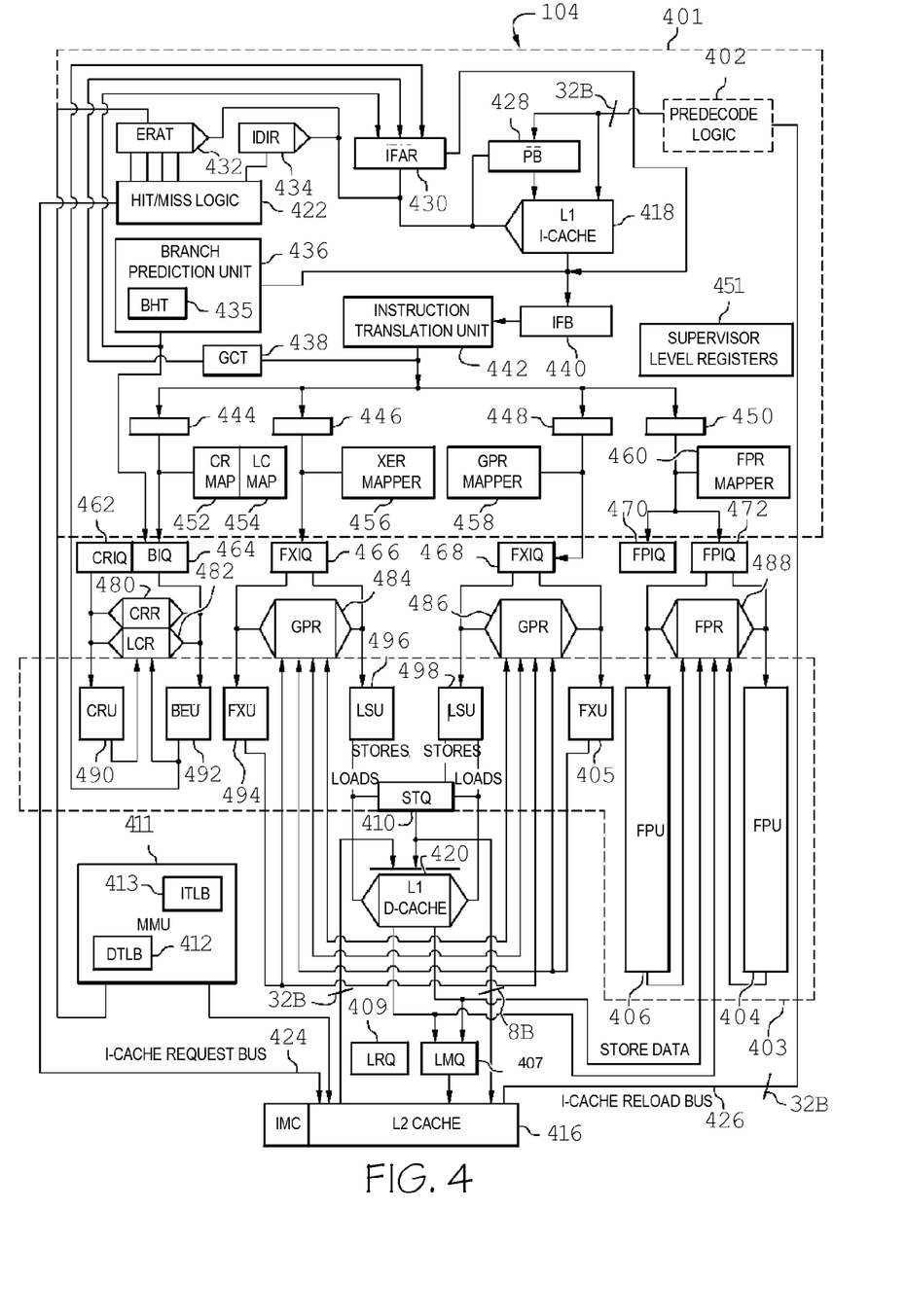
FIG. 4 illustrates additional detail of a core within the processor in the mobile device.
Figure 5:
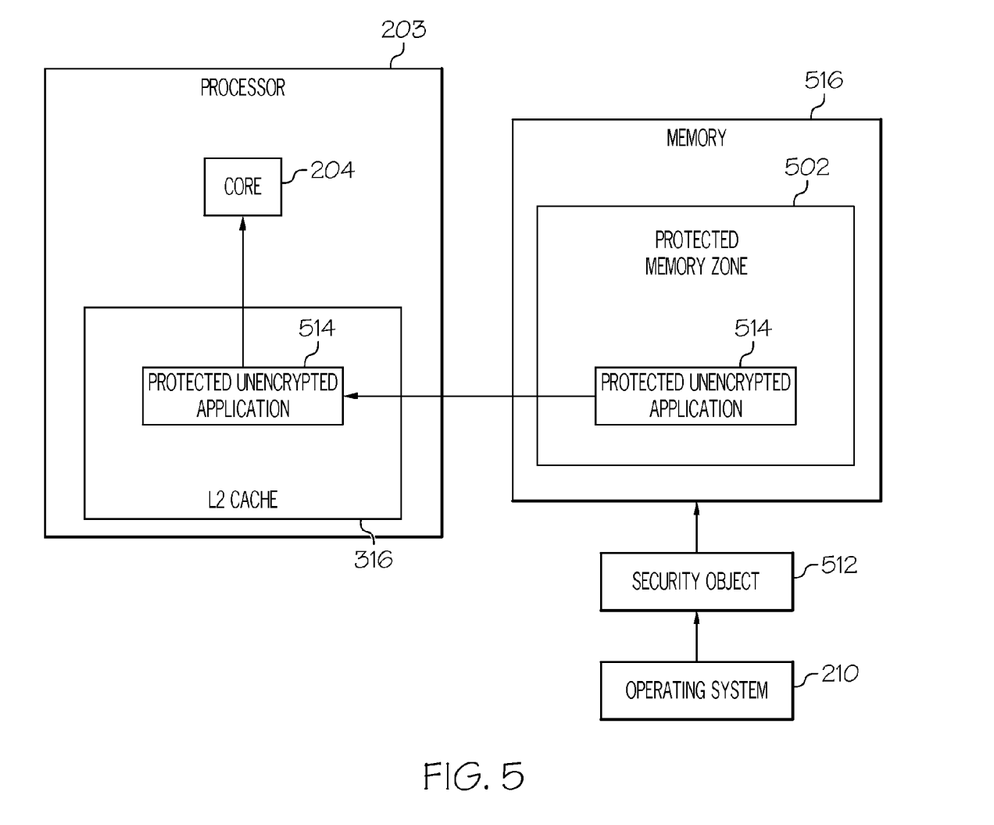
FIG. 5 depicts additional detail of a protected application, within a mobile device, being stored within a protected memory zone within the mobile device.

Referring now to FIG. 4, additional exemplary detail of core 104/304/504, as respectively depicted in FIGS. 1, 3, and 5, is presented. Core 104 includes an on-chip multi-level cache hierarchy including a unified level two (L2) cache 416 and bifurcated level one (L1) instruction (I) and data (D) caches 418 and 420, respectively. As is well-known to those skilled in the art, caches 416, 418 and 420 provide low latency access to cache lines corresponding to memory locations in system memories (e.g., system memory 136 shown in FIG. 1).

Instructions are fetched for processing from L1 I-cache 418 in response to the effective address (EA) residing in instruction fetch address register (IFAR) 430. During each cycle, a new instruction fetch address may be loaded into IFAR 430 from one of three sources: branch prediction unit (BPU) 436, which provides speculative target path and sequential addresses resulting from the prediction of conditional branch instructions, global completion table (GCT) 438, which provides flush and interrupt addresses, and branch execution unit (BEU) 492, which provides non-speculative addresses resulting from the resolution of predicted conditional branch instructions. Associated with BPU 436 is a branch history table (BHT) 435, in which are recorded the resolutions of conditional branch instructions to aid in the prediction of future branch instructions.

An effective address (EA), such as the instruction fetch address within IFAR 430, is the address of data or an instruction generated by a processor. The EA specifies a segment register and offset information within the segment. To access data (including instructions) in memory, the EA is converted to a real address (RA), through one or more levels of translation, associated with the physical location where the data or instructions are stored.

Within core 104, effective-to-real address translation is performed by memory management units (MMUs) and associated address translation facilities. Preferably, a separate MMU is provided for instruction accesses and data accesses. In FIG. 4, a single MMU 411 is illustrated, for purposes of clarity, showing connections only to Instruction Store Unit (ISU) 401. However, it is understood by those skilled in the art that MMU 411 also preferably includes connections (not shown) to load/store units (LSUs) 496 and 498 and other components necessary for managing memory accesses. MMU 411 includes Data Translation Lookaside Buffer (DTLB) 412 and Instruction Translation Lookaside Buffer (ITLB) 413. Each TLB contains recently referenced page table entries, which are accessed to translate EAs to RAs for data (DTLB 412) or instructions (ITLB 413). Recently referenced EA-to-RA translations from ITLB 413 are cached in EOP effective-to-real address table (ERAT) 432.

If hit/miss logic 422 determines, after translation of the EA contained in IFAR 430 by ERAT 432 and lookup of the real address (RA) in I-cache directory 434, that the cache line of instructions corresponding to the EA in IFAR 430 does not reside in L1 I-cache 418, then hit/miss logic 422 provides the RA to L2 cache 416 as a request address via I-cache request bus 424. Such request addresses may also be generated by prefetch logic within L2 cache 416 based upon recent access patterns. In response to a request address, L2 cache 416 outputs a cache line of instructions, which are loaded into prefetch buffer (PB) 428 and L1 I-cache 418 via I-cache reload bus 426, possibly after passing through optional pre-decode logic 402.

Once the cache line specified by the EA in IFAR 430 resides in L1 I-cache 418, L1 I-cache 418 outputs the cache line to both branch prediction unit (BPU) 436 and to instruction fetch buffer (IFB) 440. BPU 436 scans the cache line of instructions for branch instructions and predicts the outcome of conditional branch instructions, if any. Following a branch prediction, BPU 436 furnishes a speculative instruction fetch address to IFAR 430, as discussed above, and passes the prediction to branch instruction queue 464 so that the accuracy of the prediction can be determined when the conditional branch instruction is subsequently resolved by branch execution unit 492.

IFB 440 temporarily buffers the cache line of instructions received from L1 I-cache 418 until the cache line of instructions can be translated by instruction translation unit (ITU) 442. In the illustrated embodiment of core 104, ITU 442 translates instructions from user instruction set architecture (UISA) instructions into a possibly different number of internal ISA (IISA) instructions that are directly executable by the execution units of core 104. Such translation may be performed, for example, by reference to microcode stored in a read-only memory (ROM) template. In at least some embodiments, the UISA-to-IISA translation results in a different number of IISA instructions than UISA instructions and/or IISA instructions of different lengths than corresponding UISA instructions. The resultant IISA instructions are then assigned by global completion table 438 to an instruction group, the members of which are permitted to be dispatched and executed out-of-order with respect to one another. Global completion table 438 tracks each instruction group for which execution has yet to be completed by at least one associated EA, which is preferably the EA of the oldest instruction in the instruction group.

Following UISA-to-IISA instruction translation, instructions are dispatched to one of latches 444, 446, 448 and 450, possibly out-of-order, based upon instruction type. That is, branch instructions and other condition register (CR) modifying instructions are dispatched to latch 444, fixed-point and load-store instructions are dispatched to either of latches 446 and 448, and floating-point instructions are dispatched to latch 450. Each instruction requiring a rename register for temporarily storing execution results is then assigned one or more rename registers by the appropriate one of CR mapper 452, link and count (LC) register mapper 454, exception register (XER) mapper 456, general-purpose register (GPR) mapper 458, and floating-point register (FPR) mapper 460.

The dispatched instructions are then temporarily placed in an appropriate one of CR issue queue (CRIQ) 462, branch issue queue (BIQ) 464, fixed-point issue queues (FXIQs) 466 and 468, and floating-point issue queues (FPIQs) 470 and 472. From issue queues 462, 464, 466, 468, 470 and 472, instructions can be issued opportunistically to the execution units of processor 103 (shown in FIG. 1) for execution as long as data dependencies and antidependencies are observed. The instructions, however, are maintained in issue queues 462-472 until execution of the instructions is complete and the result data, if any, are written back, in case any of the instructions need to be reissued.

As illustrated, the execution units of core 104 include a CR unit (CRU) 490 for executing CR-modifying instructions, a branch execution unit (BEU) 492 for executing branch instructions, two fixed-point units (FXUs) 494 and 405 for executing fixed-point instructions, two load-store units (LSUs) 496 and 498 for executing load and store instructions, and two floating-point units (FPUs) 406 and 404 for executing floating-point instructions. Each of execution units 490-404 is preferably implemented as an execution pipeline having a number of pipeline stages.

During execution within one of execution units 490-404, an instruction receives operands, if any, from one or more architected and/or rename registers within a register file coupled to the execution unit. When executing CR-modifying or CR-dependent instructions, CRU 490 and BEU 492 access the CR register file 480, which in a preferred embodiment contains a CR and a number of CR rename registers that each comprise a number of distinct fields formed of one or more bits. Among these fields are LT, GT, and EQ fields that respectively indicate if a value (typically the result or operand of an instruction) is less than zero, greater than zero, or equal to zero. Link and count register (LCR) file 482 contains a count register (CTR), a link register (LR) and rename registers of each, by which BEU 492 may also resolve conditional branches to obtain a path address. General-purpose register files (GPRs) 484 and 486, which are synchronized, duplicate register files, and store fixed-point and integer values accessed and produced by FXUs 494 and 405 and LSUs 496 and 498. Note that floating-point register file (FPR) 488, which like GPRs 484 and 486 may also be implemented as duplicate sets of synchronized registers, contains floating-point values that result from the execution of floating-point instructions by FPUs 406 and 404 and floating-point load instructions by LSUs 496 and 498.

After an execution unit finishes execution of an instruction, the execution unit notifies GCT 438, which schedules completion of instructions in program order. To complete an instruction executed by one of CRU 490, FXUs 494 and 405 or FPUs 406 and 404, GCT 438 signals the execution unit, which writes back the result data, if any, from the assigned rename register(s) to one or more architected registers within the appropriate register file. The instruction is then removed from the issue queue and once all instructions within its instruction group have been completed, it is removed from GCT 438. Other types of instructions, however, are completed differently.

When BEU 492 resolves a conditional branch instruction and determines the path address of the execution path that should be taken, the path address is compared against the speculative path address predicted by BPU 436. If the path addresses match, no further processing is required. If, however, the calculated path address does not match the predicted path address, BEU 492 supplies the correct path address to IFAR 430. In either event, the branch instruction can then be removed from BIQ 464, and when all other instructions within the same instruction group have completed executing, from GCT 438.

Following execution of a load instruction, the effective address computed by executing the load instruction is translated to a real address by a data ERAT (not illustrated) and then provided to L1 D-cache 420 as a request address. At this point, the load instruction is removed from FXIQ 466 or 468 and placed in load reorder queue (LRQ) 409 until the indicated load is performed. If the request address misses in L1

D-cache 420, the request address is placed in load miss queue (LMQ) 407, from which the requested data is retrieved from L2 cache 416, and failing that, from another core 104 or from system memory. LRQ 409 snoops exclusive access requests (e.g., read-with-intent-to-modify), flushes or kills on interconnect fabric (not shown) against loads in flight, and if a hit occurs, cancels and reissues the load instruction. Store instructions are similarly completed utilizing a store queue (STQ) 410 into which effective addresses for stores are loaded following execution of the store instructions. From STQ 410, data can be stored into either or both of L1 D-cache 420 and L2 cache 416.

Note that the state of a processor includes stored data, instructions and hardware states at a particular time, and are herein defined as either being "hard" or "soft." The "hard" state is defined as the information within a processor that is architecturally required for a processor to execute a process from its present point in the process. The "soft" state, by contrast, is defined as information within a processor that would improve efficiency of execution of a process, but is not required to achieve an architecturally correct result. In core 104 of FIG. 4, the hard state includes the contents of user-level registers, such as CRR 480, LCR 482, GPRs 484 and 486, FPR 488, as well as supervisor level registers 451. The soft state of core 104 includes both "performance-critical" information, such as the contents of L1 I-cache 418, L1 D-cache 420, address translation information such as DTLB 412 and ITLB 413, and less critical information, such as BHT 435 and all or part of the content of L2 cache 416. Thus, the content of such registers are fixed values that describe a real-time current architecture state register of the processor core 104.

In one embodiment of the present invention, the decoded/decrypted operands from protected application are loaded (sequentially or otherwise) directly into the L1 I-cache 418 depicted in FIG. 4, thus bypassing the IFAR 430, PB 428, predecode logic 402, etc. That is, the security object 212 creates a decrypted application 314, as described in FIG. 3. In one embodiment, the decrypted application 314 is sent to the L2 cache 416, depicted in FIG. 4, from which it is dispatched to the predecode logic 402, IFAR 430, etc. However, in one embodiment, the security object 212 generates separate operands within the decrypted application 314 (i.e., the security object 212 acts as a compiler), and sends executable operands (i.e., object code) directly to the L1 I-cache 418 depicted in FIG. 4).

Returning now to FIG. 2, a security object issuer 220 is a server/service (e.g., using one or more of the other computer(s) 152 depicted in FIG. 1) that creates the security object 212. In one embodiment, each security object is specific for a particular application. That is, a first security object may be designed to enable decryption of a first protected application; a second security object may be designed to enable decryption of a second protected application; etc. This allows a fine level of granularity for controlling which protected applications can be decrypted/enabled, as described in further detail below. As depicted in FIG. 2, in one embodiment the security object issuer 220 sends the security object 212 that is specific for decrypting the protected application 214 to the application download service 218 (e.g., using one or more of the other computer(s) 152 depicted in FIG. 1), which then sends both the security object 212 as well as the protected application 214 to the mobile device 204, which securely generates the virtual card 202.

In order to manage and further protect the use of the security object 212, a virtual card issuer deployment manager 222 (e.g., using one or more of the other computer(s) 152 depicted in FIG. 1) uses and issues a public key 224. (Note that in one embodiment, security object issuer 220 and virtual card issuer deployment manager 222 are a same entity/service/server. However, in one embodiment, security object issuer 220 and virtual card issuer deployment manager 222 are different entities, thus allowing finer granularity in controlling the user of the protected application 214.) In one embodiment the security object 212 is protected by a public key 224. When a user of the mobile device wants to use the security object 212 (i.e., to generate and/or manage the virtual card 202), the mobile device uses a private key 226 (which together with public key 224 makes up a public/private key pair) to decrypt the security object 212. In one embodiment, the private key 226 is preloaded into the mobile device 204, while in another embodiment the private key 226 is input by a user (e.g., as a password). In either embodiment, without having the public key 224, the mobile device 204 is unable to decrypt the protected security object 212. Thus, the virtual card issuer deployment manager 222 is able to control the decryption of, and thus use of, the security object 212 by a particular mobile device 204 and/or user.

For example, first assume that mobile device 204 is prohibited from permanently storing a copy of public key 224 and/or security object 212, thus making the mobile device 204 dependent upon the virtual card issuer deployment manager 222 for its ability to create and/or manage a virtual card 202. This permanent storage prohibition may be accomplished by attaching a header to a packet that delivers the public key 224 or the security object 212, where the header contains an instruction that causes the key/security object to be automatically deleted from the mobile device 204 after a predetermined length of time. Thus, without the public key 224 and/or security object 212, the mobile device is unable to run a particular protected application 214. This enables the virtual card issuer deployment manager 222 to selectively enable various applications that depend on the key/security object in real time or near-real time. For example, assume that a first protected application is used to create a virtual building access card. Assume further that the first protected application requires a first security object and/or a first public key to execute that first protected application. Assume further that a second protected application is used to create a virtual identification card, and that the second protected application requires a second security object and/or a second public key to execute that second protected application. By "blanking" (i.e., erasing from memory) only the first security object and/or first public key, the mobile device can still generate the virtual identification card, but can no longer generate, use, update, or manage the virtual building access card. This allows the virtual card issuer deployment manager 222, application download service 218, and/or security object issuer 220 to selectively control which virtual cards are active/valid within the mobile device 204 at any time.

While the invention has been described using encryption to protect applications that are used to create virtual cards, applications in one embodiment can be protected according to where they are stored. For example, consider the system depicted in FIG. 5, in which a protected application, within a mobile device, is stored within a protected memory zone within the mobile device. That is, within the mobile device (e.g., mobile device 204 shown in FIG. 2) is a memory 516, such as system memory, flash memory, etc. Memory 516 has a protected memory zone 502, which can only be accessed by the operating system 210 with proper security credentials/objects, such as security object 512. Security object 512 is similar to the security object 212 shown in FIG. 2, in that it may be issued by a security object issuer 220, transmitted to the mobile device 204 by an application download service 218, protected by a public key 224 from a virtual card issuer deployment manager 222, etc. However, in the process depicted in FIG. 5, the application used to create that virtual card (e.g., virtual card 202 shown in FIG. 2) may or may not be encrypted. If the application needed to create the virtual card is not encrypted (e.g., protected unencrypted application 514 shown in FIG. 5), protected unencrypted application 514 is still protected based on the fact that it is stored in the protected memory zone 502 of memory 516. That is, without the security object 512, the operating system 210 cannot access the protected memory zone 502, and thus cannot access the protected unencrypted application 514, thereby preventing the creation and/or use and/or maintenance of the virtual card.

In one embodiment, the security object 512 contains a security algorithm/key/password, which is required by a memory manager (not shown) to allow the operating system 210 to access the protected memory zone 502. If the mobile device has a copy of the security object 512 (i.e., it has been sent from the application download service 218 and/or unwrapped/decrypted using the public/private key pair described in FIG. 2), then the protected unencrypted application 514 is loaded into L2 cache 316 (or other operational memory) for use by core 204 within processor 203. Note that the protected unencrypted application 514 is still protected from malicious attack via the (unprotected) operating system 210, since it 1) cannot be accessed outside of the processor 203 and/or memory 516, and 2) can only be accessed through the use of the security object 512.

Note that while element 514 in FIG. 5 is described as being "unencrypted", in one embodiment it actually is encrypted (e.g., using the process(es) described above). That is, even though protected unencrypted application 514 is secure due to where it is stored (i.e., within protected memory zone 502), in one embodiment additional protection is provided by encrypting the application 514 before it is stored within the protected memory zone 502.

Note that while, for purposes of clarity, the memory 216 shown in FIG. 2 depicts only the protected application 214 as being contained within memory 216, is it understood that memory 216 (e.g., system memory) will also contain OS 210, security object 212, public key 224, and/or private key 226, as may be required for implementing the invention disclosed herein.

Note again that in FIG. 2 and/or FIG. 5, in one embodiment the protected application 214 and/or the protected unencrypted application 514 are unusable until they are inside of the processor 203, where they are converted into their usable form using the security object 212. This ensures that the creation/execution of the virtual card 202 cannot be performed without the use of the security object 212, which use must occur inside of (within) the processor 203.

Figure 6:
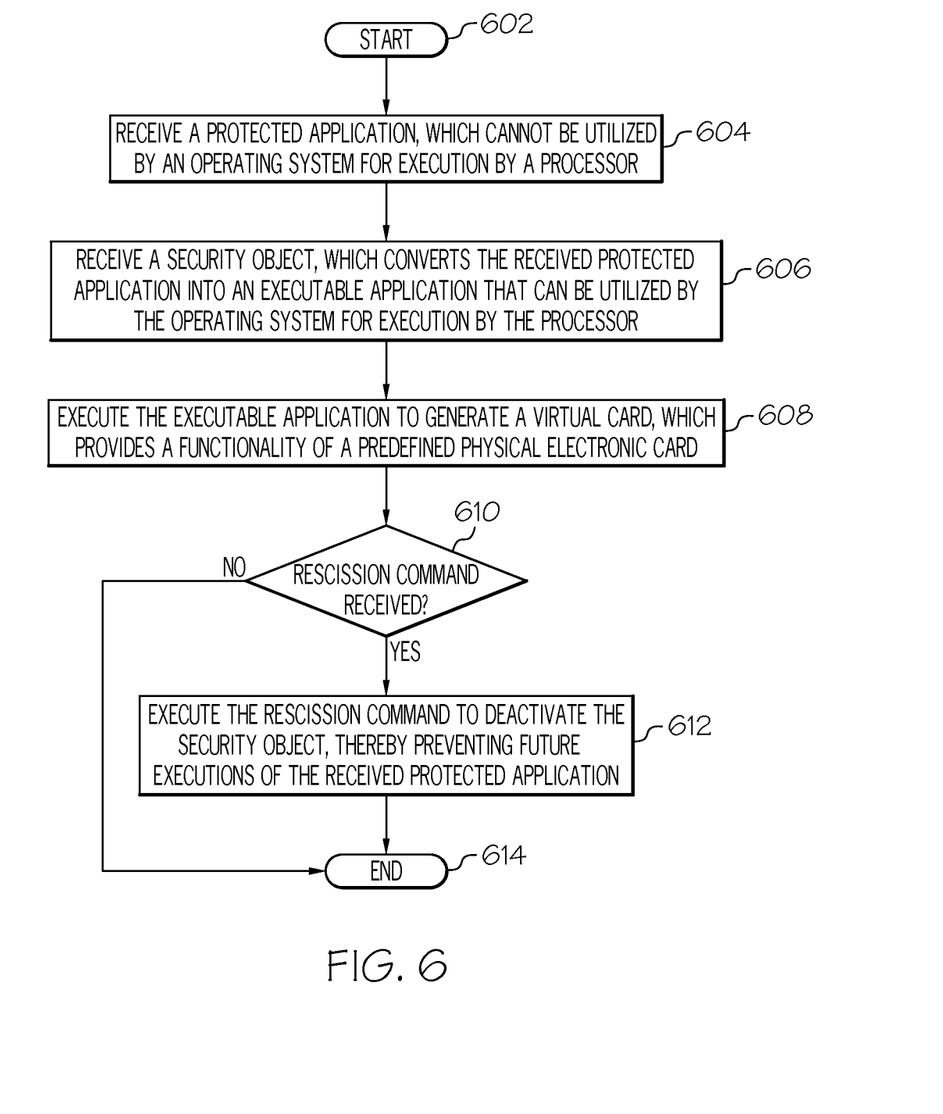
FIG. 6 is a high-level flow chart of exemplary steps taken to securely generate and/or manage a virtual card within a mobile device.

With reference now to FIG. 6, a high-level flow chart of exemplary steps taken by one or more processors to securely generate and/or manage a virtual card within a mobile device is presented. After initiator block 602, a mobile device receives a protected application (block 604). Examples of the protected application are depicted in FIG. 2 as protected application 214 and in FIG. 5 as protected unencrypted application 514. In any embodiment, the received protected application, in its present state, cannot be utilized by an operating system for execution by a processor (i.e., it is encrypted, is stored within a currently inaccessible protected zone in memory, etc.).

As described in block 606, the mobile device receives a security object (e.g., element 212 shown in FIG. 2 and/or element 512 shown in FIG. 5). As described herein, the security object is used to convert the received protected application into an executable application that can be utilized by the operating system for execution by the processor, by decryption, enablement of access to protected memory, etc.

As described in block 608, a processor within the mobile device then uses the security object to create, through the use of a protected application, a virtual card (e.g., element 202 shown in FIG. 2). This virtual card is a software-based object that provides the functionality of a predefined physical electronic card. For example, the virtual card may generate a matrix barcode, which is displayed on the screen of the mobile device. This matrix barcode is then readable by a scanner to provide the same functionality of a credit/debit/gift card, identification card, building access card, toll road access card, retail store "reward" card, etc.

As described in query block 610, a query is made at the mobile device (or alternatively, by a third party management system) regarding whether a rescission command has been received (again, by the mobile device and/or the third party management system). This rescission command causes the previously received security object, and/or the public key used to encrypt the security object, to be deactivated. In one embodiment, this deactivation is performed by erasing (i.e., "blanking") the received security object and/or the protected application from all memory in the mobile device. The protected security object that is erased may be that non-executable application (e.g., protected application 214 shown in FIG. 3) and/or the executable application (e.g., decrypted application 314 shown in FIG. 3). In another embodiment, this deactivation is performed by executing new code that blocks a processor within the mobile device from accepting instructions from the enabled protected application.

As described in block 612 of FIG. 6, the rescission command is then executed on and/or on behalf of the mobile device, in order to prevent future executions of the received protected application and/or use and/or management thereof. Again, in one embodiment, executing the rescission command simply erases the security object, public key used to decrypt the security object, the protected or unprotected application, and/or the virtual card from the mobile device. In another embodiment, some or all of these elements (the security object, public key used to decrypt the security object, the protected or unprotected application) remain stored on the mobile device, but are disabled by additional code that prevents their execution/operation.

As described in FIG. 3, in one embodiment of the present invention, the received protected application is encrypted, and the security object is a processor-executable decryption object. In this embodiment, the method described in FIG. 6 further comprises decrypting the received protected application with the security object, thus generating the decrypted application 314 that can be executed by the core 304 shown in FIG. 3.

As described in FIG. 5, in one embodiment of the present invention, the received protected application is stored in a protected region of memory within the mobile device. The security object thus provides access to the protected region of the memory within the mobile device, and the method described in FIG. 6 further comprises utilizing the security object to access the received protected application within the protected region of the memory within the mobile device (as described in exemplary detail in FIG. 5).

As described now and herein, and in further reference to FIG. 4, in one embodiment of the present invention the mobile device comprises a processor, the processor comprises a core, and the core comprises an instruction cache. In one embodiment, the executable application comprises multiple processor-executable operands (i.e., multiple lines of executable instructions). In this embodiment, and as described in further detail in FIG. 4, the method further comprises moving a processor-executable operand from the executable application directly into an instruction cache in the core while bypassing an instruction fetch address register (IFAR) in the core. That is, rather than sending executable operands through predecode logic 402, IFAR 430, etc. in FIG. 4, the security object is able to push executable operands directly onto the L1 I-cache 418, thus providing faster, and yet still secure, operations within the core. Note that L1 denotes lowest level of cache, which is first checked to locate an operand (in the case of an instruction (I) cache) or data (in the case of a data (D) cache). If the requisite operand/data is not found within the L1 cache (i.e., a "cache miss"), then the next highest level cache memory (L2 cache) is searched. If there is an L2 cache miss, then the next highest L3 cache (if the system has an L3 level cache) is searched. If there is an L2/L3 cache miss, then system memory is searched for the requisite operand/data. If system memory does not have the needed operand/data (e.g., a page fault), then virtual memory, persistent memory (e.g., a hard drive), and/or a memory cloud (e.g., a network of storage devices) are searched for the needed operand or data.

In one embodiment of the present invention, the physical electronic card being emulated by the virtual card on the mobile device is a payment card. In this embodiment, the method described in FIG. 6 further comprises generating a matrix barcode that contains payment information for a user of the mobile device, and then displaying the matrix barcode on a display on the mobile device. In another embodiment, the emulated payment card generates a radio frequency signal, such as those used by a secure wireless communication (e.g., a near-field communication used with smart-card standard protocols), to generate payment information/authorization.

In one embodiment of the present invention, the physical electronic card being emulated by the virtual card on the mobile device is an identification (ID) card. In the embodiment, the method described in FIG. 6 further comprises generating a matrix barcode that contains identification information for a user of the mobile device, and then displaying the matrix barcode on a display on the mobile device. In another embodiment, the emulated identification card generates a radio frequency signal, such as those used by a secure wireless communication (e.g., a near-field communication used with smart-card standard protocols), to generate identity information/authorization.

In one embodiment of the present invention, the physical electronic card being emulated by the virtual card on the mobile device is a premises access card (i.e., a card that, when swiped, opens a locked door, notifies a security station, etc.). In this embodiment, the method described in FIG. 6 further comprises generating a matrix barcode that contains access authorization information for a user of the mobile device, and then displaying the matrix barcode on a display on the mobile device. In another embodiment, the emulated access card generates a radio frequency signal, such as those used by a secure wireless communication (e.g., a near-field communication used with smart-card standard protocols), to generate premises access information/authorization.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Note that the flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the invention of the present application in detail and by reference to illustrative embodiments thereof, it will be apparent that modifications and variations are possible without departing from the scope of the invention defined in the appended claims.

What is claimed is:

1. A method of securely generating and managing a virtual card on a mobile device, the method comprising a mobile device:
   receiving a protected application, wherein a received protected application initially cannot be utilized by an operating system for execution by a processor;
   receiving a security object, wherein the security object is used to convert the received protected application into an executable application that can be utilized by the operating system for execution by the processor;
   executing the executable application by the processor to act as a virtual card, wherein the virtual card provides a functionality of a predefined physical electronic card;
   receiving a rescission command at the mobile device;
   executing the rescission command to deactivate the security object, wherein deactivating the security object prevents future executions of the received protected application;
   receiving the security object in a header of a packet, wherein the packet delivers the security object to the mobile device;
   receiving an instruction in the header to automatically delete the security object from the mobile device after a predetermined length of time; and
   automatically deleting the security object from the mobile device after the predetermined length of time.

2. The method of claim 1, wherein the received protected application is stored in a protected region of memory within the mobile device, wherein the security object provides access to the protected region of the memory within the mobile device, and wherein the method further comprises:
   utilizing the security object to access the received protected application within the protected region of the memory within the mobile device.

3. The method of claim 1, wherein the mobile device comprises a processor, wherein the processor comprises a core, wherein the core comprises an L1 instruction cache, wherein the executable application comprises multiple processor-executable operands, and wherein the method further comprises:
   moving a processor-executable operand from the executable application directly into the L1 instruction cache in the core by bypassing an instruction fetch address register (IFAR) in the core.

4. The method of claim 1, wherein the predefined physical electronic card is a payment card, wherein the mobile device comprises a display, and wherein the method further comprises:

generating a matrix barcode that contains payment information for a user of the mobile device; and
displaying the matrix barcode on the display on the mobile device.

5. The method of claim 1, wherein the predefined physical electronic card is an identification card, wherein the mobile device comprises a display, and wherein the method further comprises:
generating a matrix barcode that contains identification information for a user of the mobile device; and
displaying the matrix barcode on the display on the mobile device.

6. The method of claim 1, wherein the predefined physical electronic card is a premises access card, wherein the mobile device comprises a display, and wherein the method further comprises:
generating a matrix barcode that contains access authorization information for a user of the mobile device; and
displaying the matrix barcode on the display on the mobile device.

7. The method of claim 1, wherein the predefined physical electronic card comprises a magnetic strip for holding information about a user of a physical electronic card.

8. A computer program product for generating and managing a virtual card on a mobile device, the computer program product comprising a computer readable storage medium having program code embodied therewith, the program code readable and executable by one or more processors to perform a method comprising:
receiving a protected application, wherein a received protected application initially cannot be utilized by an operating system for execution by a processor;
receiving a security object, wherein the security object is used to convert the received protected application into an executable application that can be utilized by the operating system for execution by the processor;
executing the executable application by the processor to act as a virtual card, wherein the virtual card provides a functionality of a predefined physical electronic card;
receiving a rescission command at the mobile device;
executing the rescission command to deactivate the security object, wherein deactivating the security object prevents future executions of the received protected application;
receiving the security object in a header of a packet, wherein the packet delivers the security object to the mobile device;
receiving an instruction in the header to automatically delete the security object from the mobile device after a predetermined length of time; and
automatically deleting the security object from the mobile device after the predetermined length of time.

9. The computer program product of claim 8, wherein the received protected application is stored in a protected region of memory within the mobile device, wherein the security object provide access to the protected region of the memory within the mobile device, and wherein the method further comprises:
utilizing the security object to access the received protected application within the protected region of the memory within the mobile device.

10. The computer program product of claim 8, wherein the mobile device comprises a processor, wherein the processor comprises a core, wherein the core comprises an instruction cache, wherein the executable application comprises multiple processor-executable operands, and wherein the method further comprises:

moving a processor-executable operand from the executable application directly to the instruction cache in the core by bypassing an instruction fetch address register (IFAR) in the core.

11. The computer program product of claim 8, wherein the predefined physical electronic card is a payment card, wherein the mobile device comprises a display, and wherein the method further comprises:
generating a matrix barcode that contains payment information for a user of the mobile device; and
displaying the matrix barcode on the display on the mobile device.

12. The computer program product of claim 8, wherein the predefined physical electronic card is an identification card, wherein the mobile device comprises a display, and wherein the method further comprises:
generating a matrix barcode that contains identification information for a user of the mobile device; and
displaying the matrix barcode on the display on the mobile device.

13. The computer program product of claim 8, wherein the predefined physical electronic card is a premises access card, wherein the mobile device comprises a display, and wherein the method further comprises:
generating a matrix barcode that contains access authorization information for a user of the mobile device; and
displaying the matrix barcode on the display on the mobile device.

14. A computer system comprising:
a processor, a computer readable memory, and a computer readable storage medium;
first program instructions to receive a protected application, wherein a received protected application cannot be utilized by an operating system for execution by a processor;
second program instructions to receive a security object, wherein the security object is used to convert the received protected application into an executable application that can be utilized by the operating system for execution by the processor;
third program instructions to execute the executable application by the processor to act as a virtual card, wherein the virtual card provides a functionality of a predefined physical magnetic-strip card;
fourth program instructions to receive a rescission command at the mobile device;
fifth program instructions to execute the rescission command to deactivate the security object, wherein deactivating the security object prevents future executions of the received protected application;
sixth program instructions to receive the security object in a header of a packet, wherein the packet delivers the security object to the mobile device;
seventh program instructions to receive an instruction in the header to automatically delete the security object from the mobile device after a predetermined length of time; and
eighth program instructions to automatically delete the security object from the mobile device after the predetermined length of time; and
wherein the first, second, third, fourth, fifth, sixth, seventh, and eighth program instructions are stored on the computer readable storage medium and executed by the processor via the computer readable memory.

15. The computer system of claim 14, wherein the received protected application is stored in a protected region of memory within the mobile device, wherein the security object provide access to the protected region of the memory within the mobile device, and wherein the computer system further comprises:

ninth program instructions to utilize the security object to access the received protected application within the protected region of the memory within the mobile device; and     wherein the ninth program instructions are stored on the computer readable storage medium and executed by the processor via the computer readable memory.

16. The computer system of claim 14, wherein the mobile device comprises a processor, wherein the processor comprises a core, wherein the core comprises an instruction cache, wherein the executable application comprises multiple processor-executable operands, and wherein the computer system further comprises:

ninth program instructions to move a processor-executable operand from the executable application directly to the instruction cache in the core by bypassing an instruction fetch address register (IFAR) in the core; and     wherein the ninth program instructions are stored on the computer readable storage medium and executed by the processor via the computer readable memory.

\* \* \* \* \*